United States Patent [19]

Benteler et al.

[11] 4,301,959
[45] Nov. 24, 1981

[54] METHOD SERIES PRODUCTION OF AN OUTER COLUMN OF A SAFETY STEERING COLUMN FOR AUTOMOTIVE VEHICLES

[75] Inventors: Hubertus Benteler, Bielefeld; Wolfgang Streubel, Barntrup; Egon Olszewski, Paderborn-Elsen, all of Fed. Rep. of Germany

[73] Assignee: Benteler-Werke A.G., Paderborn, Fed. Rep. of Germany

[21] Appl. No.: 102,941

[22] Filed: Dec. 12, 1979

[30] Foreign Application Priority Data

Dec. 30, 1978 [DE] Fed. Rep. of Germany ....... 2856877

[51] Int. Cl.$^3$ .............................................. B23K 31/06
[52] U.S. Cl. .................................... 228/102; 228/103; 228/154; 228/9; 228/49 B
[58] Field of Search .............. 180/78; 228/173 F, 154, 228/102, 103, 5.1, 6, 9, 15.1, 49 B

[56] References Cited

U.S. PATENT DOCUMENTS

| | | | |
|---|---|---|---|
| 3,470,761 | 10/1969 | Okamoto | 180/78 |
| 3,621,732 | 11/1971 | Kaniut | 180/78 |
| 4,161,273 | 7/1979 | Jeffers | 228/173 F |
| 4,163,886 | 8/1979 | Omae et al. | 228/9 |

OTHER PUBLICATIONS

"Dynamic Resistance Spot Weld Analyzer" by C. A. Keskimaki Western Electric Technical Digest No. 46, Apr. 1977.

*Primary Examiner*—John McQuade
*Attorney, Agent, or Firm*—Michael J. Striker

[57] ABSTRACT

A method for series production of an outer column for a safety steering column for motor vehicles in which a first tubular blank is stepwise moved to a plurality of working stations in which the blank is deformed respectively punched to form a substantially smooth-walled protecting tube of the outer column. A second tubular blank is simultaneously moved to a working station in which it is transformed into a corrugated tube and subsequently the two tubes are fed against each other so that end portions of the tube overlap and the overlapping tubes are then welded together in a main welding station. Thereafter at least one pressed metal part is welded to one of the tubes at an auxiliary welding station. At least one control station is coordinated with at least one working station for the first tubular blank and at least one additional control station is coordinated with at least one of the welding stations for checking the work performed by the at least one working and the at least one welding station. After ascertaining of a faulty part in one of the control stations; at least operation of all working and welding stations upstream of the one control station is stopped under simultaneous arresting the part in the upstream working and welding station. Resuming of operation of the working and welding station is then permitted only after removing of the faulty part.

8 Claims, 13 Drawing Figures

METHOD SERIES PRODUCTION OF AN OUTER COLUMN OF A SAFETY STEERING COLUMN FOR AUTOMOTIVE VEHICLES

BACKGROUND OF THE INVENTION

The present invention relates to a method for the series production of an essentially circular cylindrical outer column for the reception in the interior of a safety steering column for motor vehicles.

It is known that the driver of a motor vehicle during frontal collision of the motor vehicle may suffer considerable injuries because his chest is pushed against the steering wheel. In order to reduce such danger of injury to the driver, it is preferred to construct the steering column as a safety steering column with a substantially circular cylindrical outer column which receives in the interior thereof a steering column which during frontal collision will telescopically collapse.

The steering wheel is fixed to the end of the safety steering column which is directed towards the passenger compartment of the vehicle and the steering linkage is connected to the opposite end of the steering column. The outer column comprises an upper essentially smooth walled protecting tube which is yieldably attached to a fixed portion of the vehicle and a lower corrugated tube coaxially connected with the protecting tube and constructed to collapse under absorption of energy upon impingement of the chest of the driver onto the steering wheel. The corrugated tube is fixedly connected with another part of the vehicle.

Two circular cylindrical smooth walled tubular blanks are used for the manufacture of the outer column of a safety steering column.

The diameter of an upper region of the tubular blank for the protecting tube is reduced in at least one working station. Eventually this tubular blank is subjected also at its end region to a machining operation for finishing the inner surface thereof and for providing a chamfer at the end and subsequently thereto this tubular blank is fed to an indentation and hole forming station in which it is provided at the upper end region with indentations as well as holes.

The apertures are provided in the first tubular blank to receive a bolt of a steering wheel lock and also for connection of holding means. The holding means preferably comprise a holding bracket welded to the tubular blank. Finally, the first tubular blank for the outer column is widened at the lower end thereof in order to be subsequently pushed onto the corrugated tube.

The blank for the corrugated tube is first fed to a corrugation station in which the tubular blank is formed into a corrugated tube by radially pressing successive corrugations into its wall. Eventually a guide bracket may be fixedly welded to the lower region of the corrugated tube.

Finally, the corrugated tube and the protecting tube are connected at end regions by welding to each other.

The thus-formed outer column for a safety steering column evidently has to satisfy certain quality requirements. During their manufacture certain tolerances have to be maintained regarding the quality of the welds provided as well as the dimensions of the finished products.

It is therefore necessary during the series production of outer columns of safety steering columns to check the parts during their production, respectively, the end product in a plurality of control stations with respect to the required quality and especially with respect of maintaining the predetermined tolerances. If these tolerances are not maintained the faulty part has to be removed from the assembly line.

SUMMARY OF THE INVENTION

It is therefore an object of the present invention to positively assure that during the series production of an outer column of a safety steering column any part not within the predetermined tolerances is positively removed from the assembly line to thus assure a perfect end product.

With these and other objects in view, which will become apparent as the description proceeds, the method according to the present invention for series production of an outer column of a safety steering column for motor vehicles from two tubular blanks and pressed metal sheet parts to attach the outer column to part of a motor vehicle mainly comprises the steps of stepwise transporting a first tubular blank to a plurality of working stations for deforming respectively punching said first tubular blank to form a substantially smooth-walled protecting tube of the outer column, simultaneously feeding a second tubular blank to a corrugation station in which the second tubular blank is transformed into a corrugated tube, feeding the protecting tube and the corrugated tube against each other so that end portions of the tubes overlap, welding the overlapping end portions of the tubes to each other in a main welding station, welding at least one pressed metal sheet part in an auxiliary welding station to one of the tubes, checking the work performed by at least one working station by at least one automatic control station coordinated therewith, checking the weld produced by at least one welding station by a further automatic control station coordinated with the one welding station, stopping upon ascertaining of a faulty part in one of the control stations operation of all working respectively welding stations upstream of said one control station under simultaneous blocking the parts in these upstream working respectively welding stations, and permitting resuming operation of said working and welding stations only after removing of the faulty part.

This method will positively prevent that a part which does not correspond to the required tolerances will be transferred to a following working or welding station which would result in an unacceptable end product.

Since according to the method of the present invention after determining of a faulty part in one of the control stations at least all working and welding stations upstream of the control station are stopped under simultaneous blocking the parts in these stations, it is also assured that before resuming operation the cause for the production for the faulty part may be ascertained and corrected.

According to the present invention it is also preferred that after stopping of the working respectively welding station, and blocking of the parts therein work can be resumed only after removing of the faulty part manually by a key-operated control arrangement. This will assure that only a supervising person having the key is in a position to restart the assembly-line.

According to a further development of the present invention all working stations, respectively welding stations are stopped upon ascertaining of a faulty part by one of the control stations, and simultaneously blocking the parts in all of the working and welding stations, and that the operation of the working and welding stations can be resumed only after removing of the faulty part.

The novel features which are considered as characteristic for the invention are set forth in particular in the appended claims. The invention itself, however, together with additional objects and advantages thereof, will be best understood from the following description of specific embodiments when read in connection with the accompanying drawings.

BRIEF DESCRIPTION OF THE DRAWING

FIGS. 1 and 2 schematically illustrate an assembly-line for carrying out the method of the present invention in which

FIGS. 3 and 4 illustrate the outer column for a safety steering column to be produced by the assembly line, wherein

DESCRIPTION OF THE PREFERRED EMBODIMENTS

Figure 3:
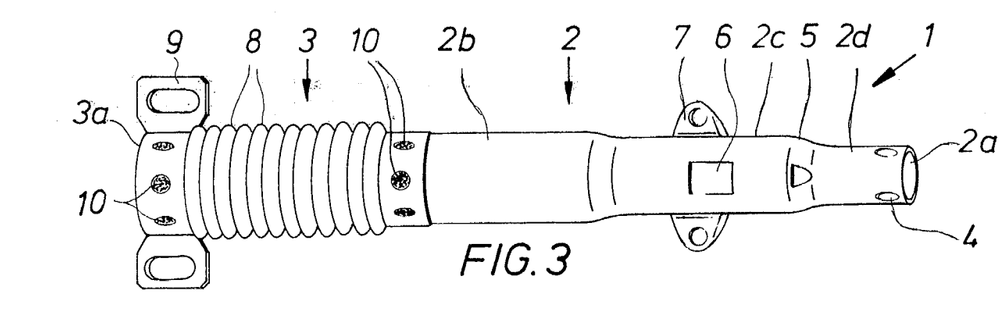
FIG. 3 illustrates the parts of the outer column in assembled condition and FIG. 4 separate from each other before assembly.
Figure 4:
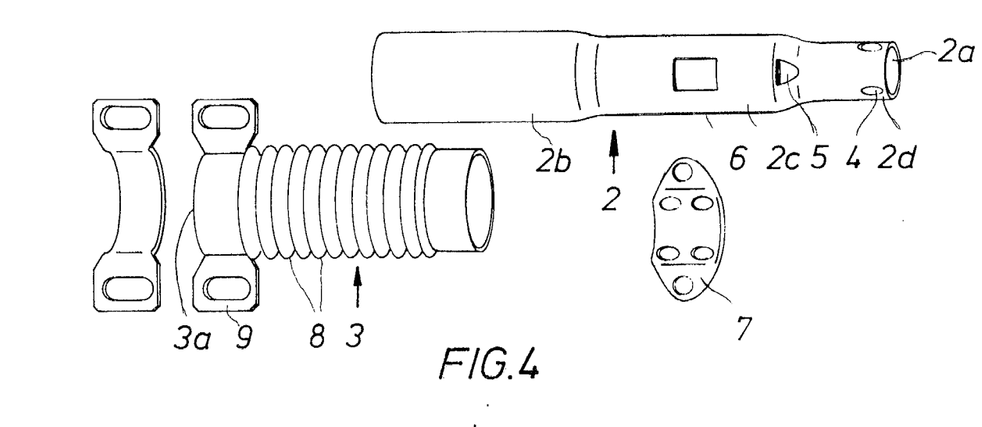

FIGS. 3 and 4 illustrate an essentially circular cylindrical outer column 1 for the reception in its interior a turnably mounted, during head-on collision axially telescoping steering shaft of a safety steering column for motor vehicles, which comprises an upper essentially smooth walled protecting tube 2 as well as a corrugated tube 3 connected to an end of the protecting tube 2 coaxially therewith.

The protecting tube 2 and the corrugated tube 3 are pushed at facing end regions thereof into each other and welded together.

After mounting of the outer tube 1 onto a motor vehicle, the free end $2a$ of the protecting tube is directed toward the passenger compartment, whereby a non-illustrated steering wheel is connected at its outer end, whereas the opposite free end $3a$ of the corrugating tube, in the region of which the steering linkage is connected, is located in the assembled condition of the outer tube within the motor space. The protecting tube 2 has three successive sections $2b$, $2c$ and $2d$, in which the section $2b$, to which the corrugated 3 is connected, has a larger outer diameter than the middle section $2c$, which in turn has an outer diameter greater than the end section $2d$.

The protecting tube 2 is provided in the section $2d$ with two apertures 4, in its transition region between the sections $2c$ and $2d$ with four circumferentially spaced indentations 5, of which only one is visible in the drawing. In its middle section $2c$ the protecting tube is provided with a further aperture 6 which serves to receive the bolt of a steering wheel lock. In the middle section $2c$ of the protecting tube 2 there is provided a holding bracket 7 which is connected by plug welding to the tube. The protecting tube 2 and therewith the whole outer column is yieldably connected by means of the holding bracket 7 to the region of the armature board of the motor vehicle.

The corrugated tube 3 has a plurality of axially successive corrugations 8. At its free end $3a$ there are fastening means in the form of two guide brackets 9 provided. The two guide brackets 9 are fixedly welded by six circumferentially displaced weld points to the free outer end of the corrugated tube. The corrugated tube 3 and therewith the outer column 1 may be fixedly connected by means of the guide brackets 9 to a further part of the motor vehicle.

Figure 5:
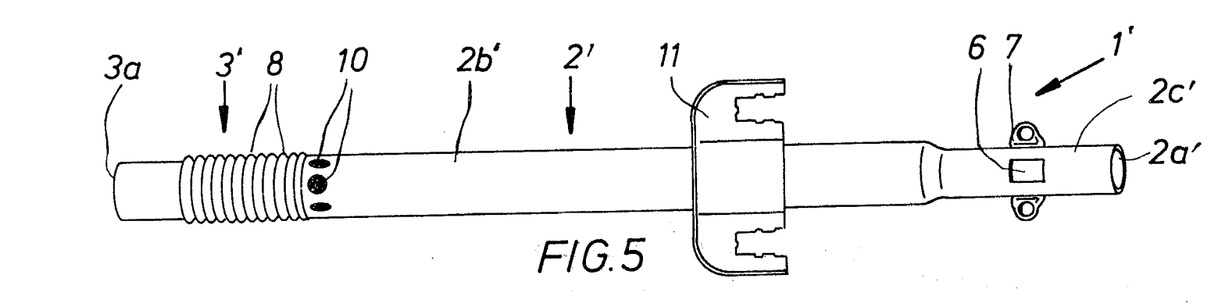
FIGS. 5 and 6 illustrate a modified embodiment of an outer column for a safety steering column, wherein FIG. 5 again illustrates the outer column in asembled condition and FIG. 6 the parts before assembly.
Figure 6:
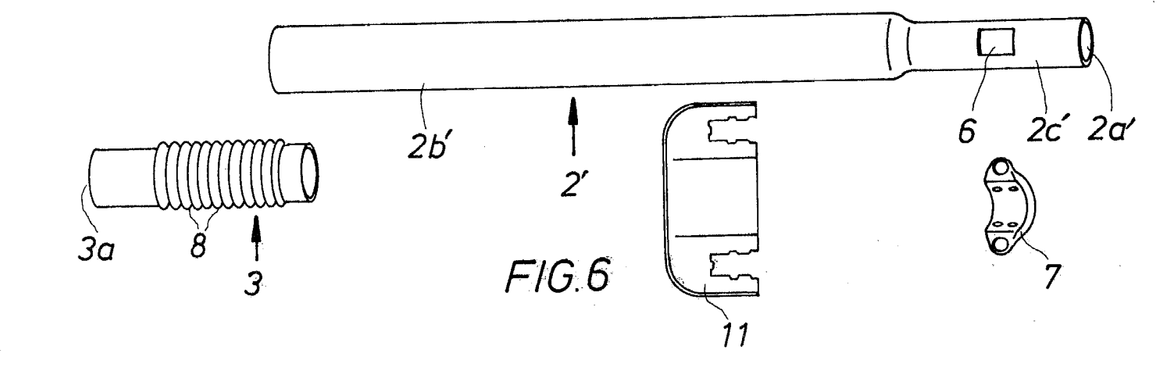

The outer column $1'$ illustrated in FIGS. 5 and 6 likewise comprises a substantially smooth-walled protecting tube $2'$ as well as a coaxially therewith arranged corrugated tube $3'$, which the facing ends of the two tubes are pushed into each other and welded together. The protecting tube $2'$ of this embodiment has only two axially successive sections $2b'$ and $2c'$ of different diameters, whereby the section $2b'$ which borders on the corrugated tube 3 has a larger diameter than the section $2c'$ at the free end $2a'$ of the protecting tube.

In this embodiment an aperture 6 for the bolt of the steering block is provided in the section $2c$ to which also a bracket 7 is connected.

In the embodiment of the outer column 1 shown in FIGS. 5 and 6 a holding bracket 11 is additionally welded to the protection tube $2'$. The corrugated tube $3'$ of the outer column $1'$ of the embodiment shown in FIGS. 5 and 6 is also provided with a plurality of axially successive corrugations 8.

Figure 1:
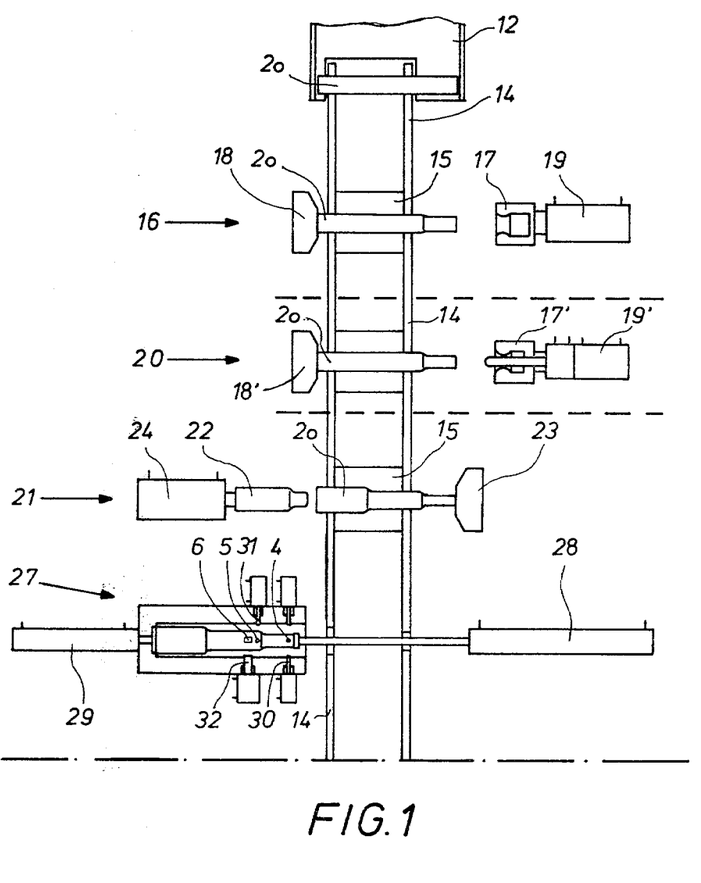
FIG. 1 illustrates the first portion of the assembly-line and FIG. 2 the second portion immediately following the first portion.
Figure 2:
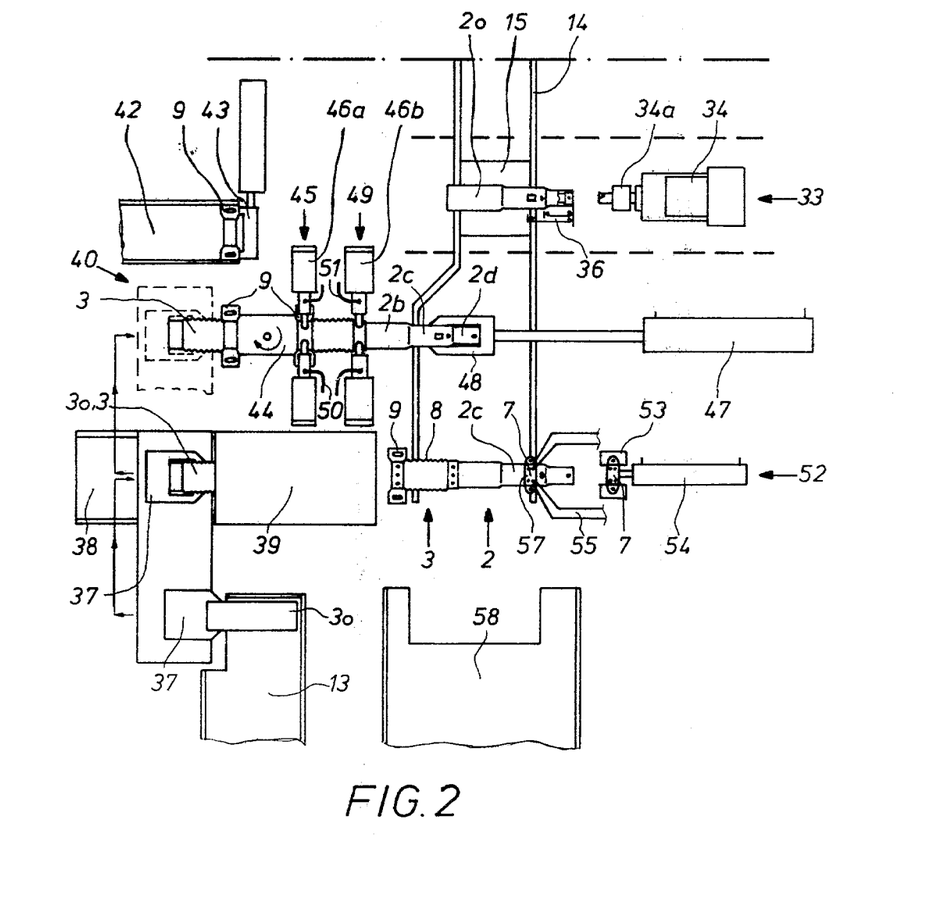

FIGS. 1 and 2 schematically illustrate the assembly line for series production of an outer column 1 as illustrated in FIGS. 3 and 4. In this production a smooth-walled circular cylindrical tubular blank $2_o$ is used for the production of the protecting tube 2 and a likewise circular cylindrical smooth-walled tubular blank $3_o$ is used for the production of the corrugated tube 3.

As shown in FIGS. 1 and 2 the assembly line for carrying out the method of series production of an outer column for a safety steering column includes a magazine 12 for the tubular blanks $2_o$ for the protecting tubes 2 and also a magazine 13 for the tubular blanks $3_o$ for the corrugated tubes 3.

Figure 7:
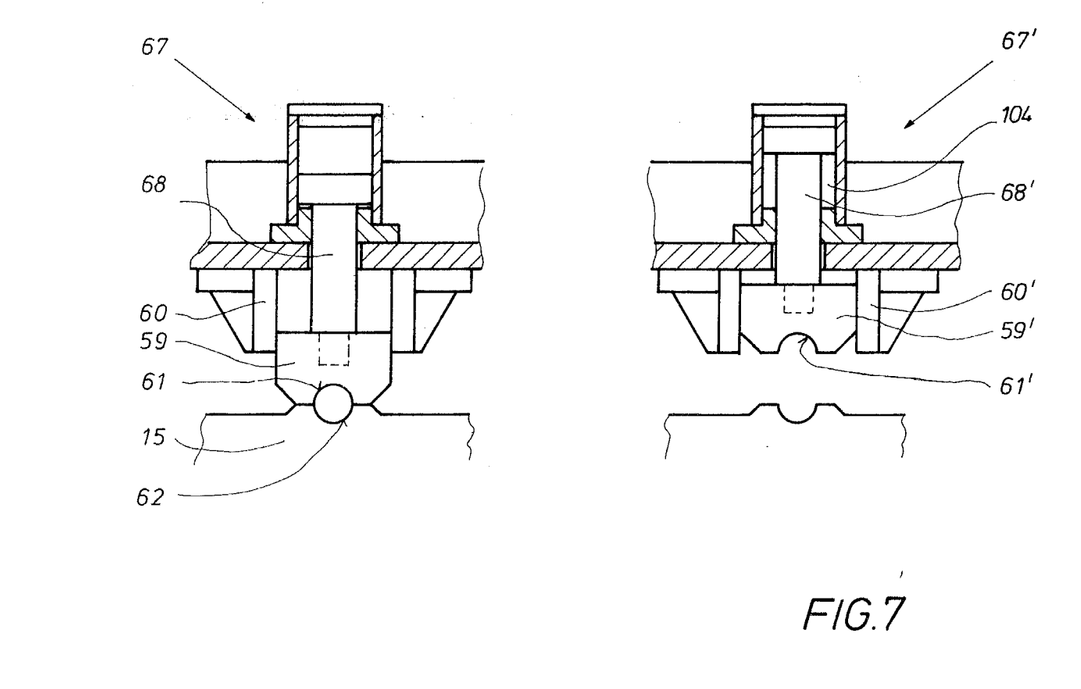
FIG. 7 schematically illustrates two clamping jaws in partly sectioned side views and showing one of the clamping jaws in clamped and the other in open position.

The various parts to be assembled are stepwise transported by means of a stepped beam conveyor 14 which moves in vertical and horizontal direction from one working station to the next and at each working station the parts are held between clamping jaws 15 and 59 (FIG. 7).

The tubular blank $2_o$ is moved from the magazine 12 at the end of the assembly line into a drawing-in station 16 adjacent thereto. The drawing in station 16 include a drawing-in matrix 17, which is axially movable by a shifting cylinder 19, to reduce the diameter of the right end portion, as viewed in FIG. 4 of the tubular blank $2_o$, while a stationary abutment 18 engages the opposite end of the tubular blank.

From the drawing-in station 16 the tubular blank $2_o$ is eventually transported to a following second drawing in station 20 which is likewise provided with a drawing-in matrix 17', an abutment 18', as well as a shifting cylinder 19'. It is preferred to provide the matrix 17' with an inner mandrel for exactly dimensioning the inner diameter of the reduced right end portion of the tubular blank $2_o$. This second drawing-in station may be omitted as indicated by the dashed lines to opposite sides of the second drawing-in station 20.

Subsequently, the tubular blank $2_o$ is transported to an expanding station 21, in which the left end portion of the blank $2_o$ is expanded to form the large diameter end section $2b$ shown in FIGS. 3 and 4. The expanding station 21 is provided with an expansion mandrel 22, an abutment 23, as well as with a shifting cylinder 24 for moving the expansion mandrel 22 in and out of the blank.

An indentation and piercing station 27 follows the expanding station 21. The station 27 comprises a shifting cylinder 28, as well as a return cylinder or ejector 29 by means of which the tubular blank $2_o$ is transported laterally out of the conveyor 14 and after the operation is performed thereon again moved back onto the conveyor 14.

The station 27 is provided with a pair of opposite punches 30 for forming the apertures 4 are, with opposite indentation punches 31 for the indentations 5, of which for simplification reason only one of the punches is shown in FIG. 1, and a single additional punch 32 for punching the aperture 6, as shown in FIG. 3 of the drawing. The punches 31 and 32 actually extend in vertical direction, but for simplification reason these punches are shown in the plane of the drawing. Each of the aforementioned punches is movable by a fluid-operated cylinder in a direction normal to the axis of the blank $2_o$.

If the assembly line is only provided with a single drawing-in station 16, then the tubular blanks $2_o$ are moved, before welding of the protecting tube 2 to the corrugated tube 3, to a station 33, in which the right end portion of the blank, as viewed in the drawing, is machined. The station 33 is omitted, as indicated by the dotted lines in FIG. 2, if the second drawing-in station 22 is provided.

The station 33 has a tool head 34a for the machining of the interior of the right end section of the blank $2_o$ and the tool head is advanced and retracted by a spindle advance and retraction device 34 of known construction. In the station 33 the tubular blanks $2_o$ are machined at their free ends $2a$ and provided at the free end with a chamfer.

In any case, that is also when a station 33 is not provided, there is arranged at this location a control station 36 for checking the position and geometry of the apertures 4 and 6 formed in the station 27.

Figure 11:
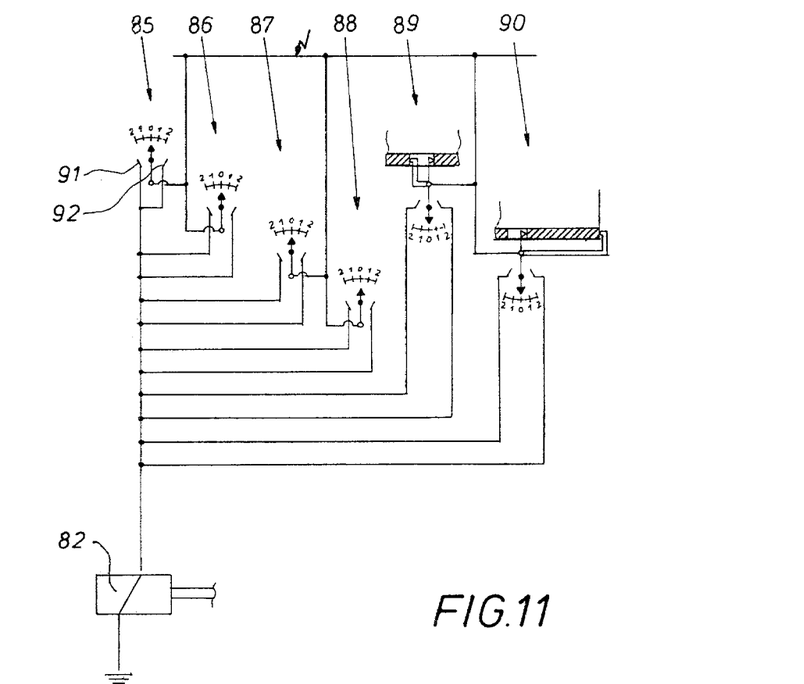
FIG. 11 schematically illustrates a wiring diagram for the various control stations.

FIG. 11 schematically illustrate the measuring instruments provided at the control station 36, in which the instrument 89 checks the diameter and the instrument 90 the position of the apertures 4 and 6. While in the schematic illustration of FIG. 11 only one instrument 89 and one instrument 90 is shown, it is to be understood that such instruments are provided for each of the apertures 4 as well as for the apertures 6. The function of these measuring instruments will be subsequently further explained.

After the tubular blanks $2_o$ have passed the control station 36, the protecting tubes 2 are present in their finished condition.

Simultaneously with the production of finished protecting tubes 2 from the tubular blanks $2_o$, the corrugated tubes are manufactured from circular cylindrical smooth-walled tubular blanks $3_o$.

For this purpose successive blanks $3_o$ are taken from a magazine 13, shown in FIG. 2, to be transported by means of clamping jaws 37 of known construction and a cross slide 38, likewise of known construction and only schematically shown in FIG. 2, into a corrugating station 39 and subsequently thereto into a preassembly station 40.

The corrugation station 39 comprises a corrugation machine of well known construction and not forming part of the present invention in which the tubular blank $3_o$ is provided with axial successive corrugations 8 by radial pressing these corrugations out from the wall of the blank so as to transform the tubular blank $3_o$ to the finished corrugated tube 3.

Adjacent the corrugation station 39 there is provided a pre-assembly station 40 which comprises a magazine 42 for the guide brackets 9. Inserting jaws 43, of well known construction not forming part of the present invention and only schematically illustrated in FIG. 2, serve to feed one after the other two guide brackets 9 to the free end of a corrugated tube 3 which is held in the region of the preassembly station 40 in a device 44. The guide brackets 9 are held in a known manner not forming part of the present invention onto the free end of the corrugated tube, whereafter the device 44 turns the corrugated tube through 180° so that the corrugated tube together with the pre-mounted guide brackets 9 is moved into the region of an auxiliary welding station 45.

At the auxiliary welding station 45 the two guide brackets 9 are welded opposite each other to the outer periphery of the end region $3a$, as shown in FIG. 3, of the corrugated tube 3. This auxiliary welding station 45 comprises six circumferentially displaced spot weld cylinders $46a$, of which only two are shown in FIG. 2.

As soon as one corrugated tube 3 is located in the auxiliary welding station 45, a finished protecting tube 2 is fed with one end against the facing end of the corrugated tube 3 so that the enlarged diameter portion at the left end of the protecting tube 2 is moved over the right end portion of the corrugated tube 3.

A shifting cylinder 47 with a clamping jaw 48 of known construction and only schematically shown in FIG. 2 serves to shift the protecting tube 2 from the conveyor 14 into overlapping arrangement with the end portion of the corrugated tube 3.

In the region of overlapping of protecting tube 2 and corrugated tube 3 the main welding station 49 is arranged which likewise comprises six circumferentially spaced spot welding cylinders $46b$, of which only two are shown in the drawing.

The overlapping end portions of the protecting tube 2 and the corrugated tube 3 are connected to each other by spot welding in the main welding station 49.

Control stations 50 and 51 are respectively coordinated with the electrodes of the main welding station 49 and the auxiliary welding station 45 for checking the quality of the welds produced by the electrodes of the auxiliary welding station 45 and the main welding station 49. Experience has shown that when the main welding parameters, that is the welding current, the welding current potential, the welding time and the pressure at which the electrodes are pressed against the workpiece are within predetermined tolerance values, the weld produced will be perfect.

In each of the weld control stations 50 and 51 is therefore an instrument 85 for checking the welding current, a further instrument 86 for checking the potential of the welding current, an instrument 87 for checking the welding time and an instrument 88 for checking the electrode pressure provided, as schematically indicated in FIG. 11. While FIG. 11 shows only one instrument 85 respectively 86, 87 and 88, it is understood that such instruments are provided for each of the electrodes of the main welding station and for each of the electrodes of the auxiliary welding stations. The permissible tolerance values for the respective welding points in the control stations 50 and 51 are incorporated as desired values in these instruments and the desired values are then compared in the control stations 50 and 51 with the actual values produced during operation.

FIG. 11 schematically illustrates a wiring diagram for the instruments 85–88 for checking the welding parameters as well as the instruments 89 and 90 for checking the diameter and positions of the apertures formed in the station 27. As mentioned before, it is to be understood that corresponding instruments 85–88 are to be provided for each welding electrode of the main welding station 49 and each of the electrodes of the auxiliary welding station 45 and corresponding instruments 89 and 90 are to be provided for each of the apertures formed in the station 27.

Each instrument has two fixed contacts 91 and 92 which determine the tolerance values. If the limit of the tolerance is reached a contact is established between the pointer of the instrument and one of the end contacts 91 or 92 so that a control current will flow to the relay 82 which, as will be explained further in connection with FIGS. 8 and 13 opens to thereby block the complete assembly line.

Figure 12:
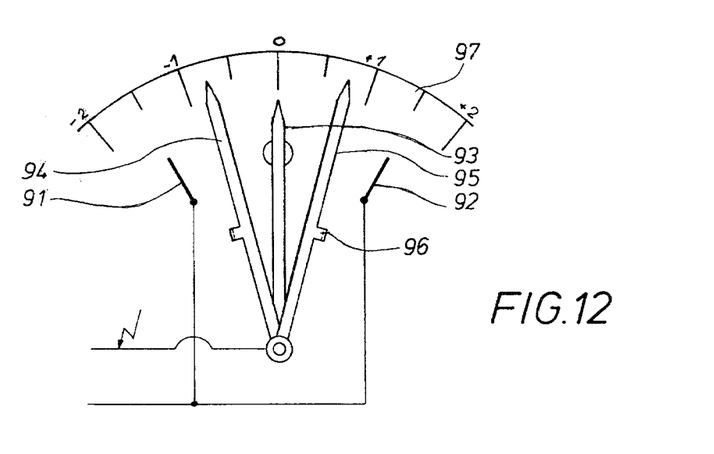
FIG. 12 schematically illustrates one of the control elements of the wiring diagram shown in FIG. 11 at an enlarged scale.

As shown in FIG. 12 each of the instruments comprises a main pointer 93 and if the main pointer 93 surpass in one or the other direction the predetermined tolerance path of the scale 97 a contact is established for a short time with the end contacts 91 or 92. The main pointer 93 during its movement will engage the portion 96 of a drag pointer 94 or 95 to move either of the same in the direction of the movement of the main pointer 93 so that the respective drag pointer will engage the contact 91 or 92 when the main pointer 93 passes beyond the predetermined tolerance limit. The control circuit remains therefore closed by the drag pointer 93 or 94 if after finishing of the welding process the main pointer 93 returns to the zero position.

Assuming that perfect welds are produced in the main welding station 49 and the auxiliary welding station 45, the welded together protecting tube 2 and the corrugated tube 3 with the brackets 9 attached thereto are again moved by the shifting cylinder 45 onto the conveyor 14.

The conveyor 14 transports then the combination of protecting tube 2 and corrugated tube 3 to a further auxiliary welding station 52 which serves to weld the bracket 7 to the protecting tube 2.

The auxiliary welding station 52 comprises an upright magazine 53 for the holding brackets 7. The lowermost holding bracket 7 in the magazine or storage bin 53 is moved by the shifting cylinder 54 to a proper place of the protecting tube 2, whereafter the holding bracket 7 is connected by plug welding under a protective gas onto the section 2c of the protecting tube. Protecting gas welding torches 55 serve for this welding process.

An additional control station 57 is provided in the region of the auxiliary welding station 53. The control station 57 checks the proper welding of the bracket 7 to the section 2c of the protecting tube which is carried out as a but welding under a protective gas. The control station 57 includes therefore instruments as shown at 85 and 86 in FIG. 11 for respectively checking the welding current and the potential of the welding current whereas two additional instruments are provided for respectively checking the advance of the welding wire and the feeding of the protective gas. It is understood that such instruments are constructed similar as shown in FIG. 12 and connected in circuit with the relay 82 as shown in FIG. 11.

Assuming all working stations and welding stations operate in perfect manner the finished outer column 1 passes finally into the magazine 58 provided at the end of the assembly line for the finished products.

The following describes the arresting means controlled by the control stations.

Figure 9:
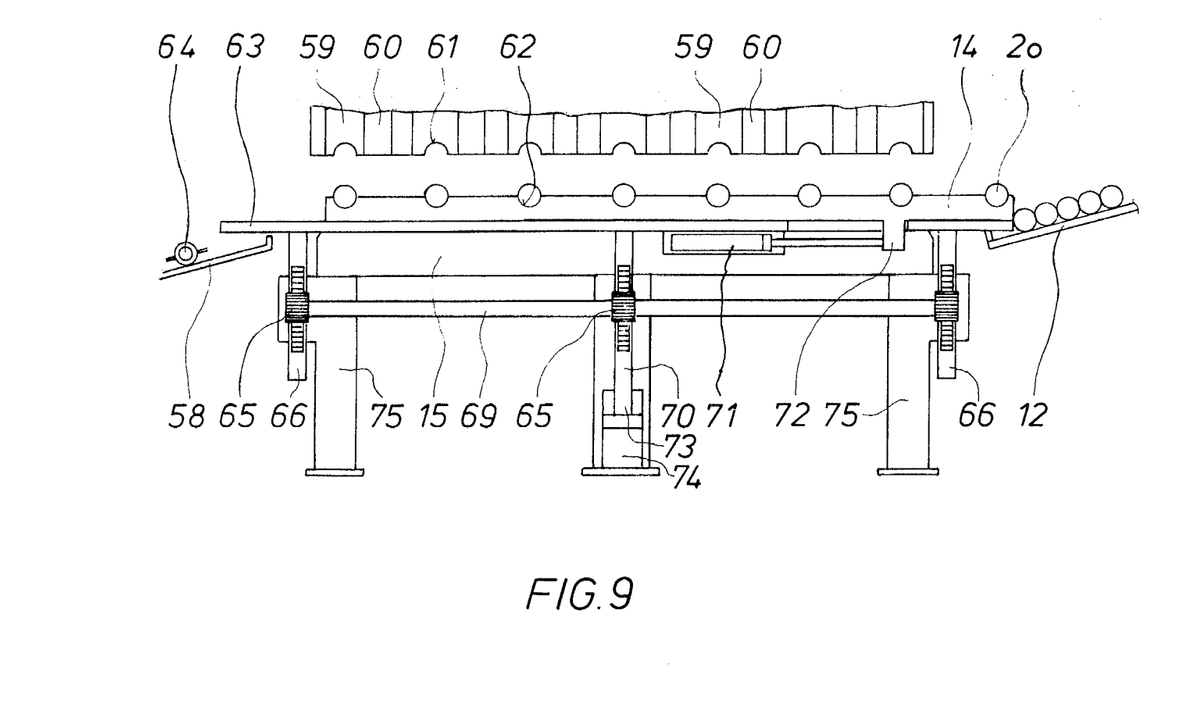
FIG. 9 schematically illustrates a side view of a stepping beam conveyor for transporting the parts from one to the other station of the assembly line.
Figure 10:
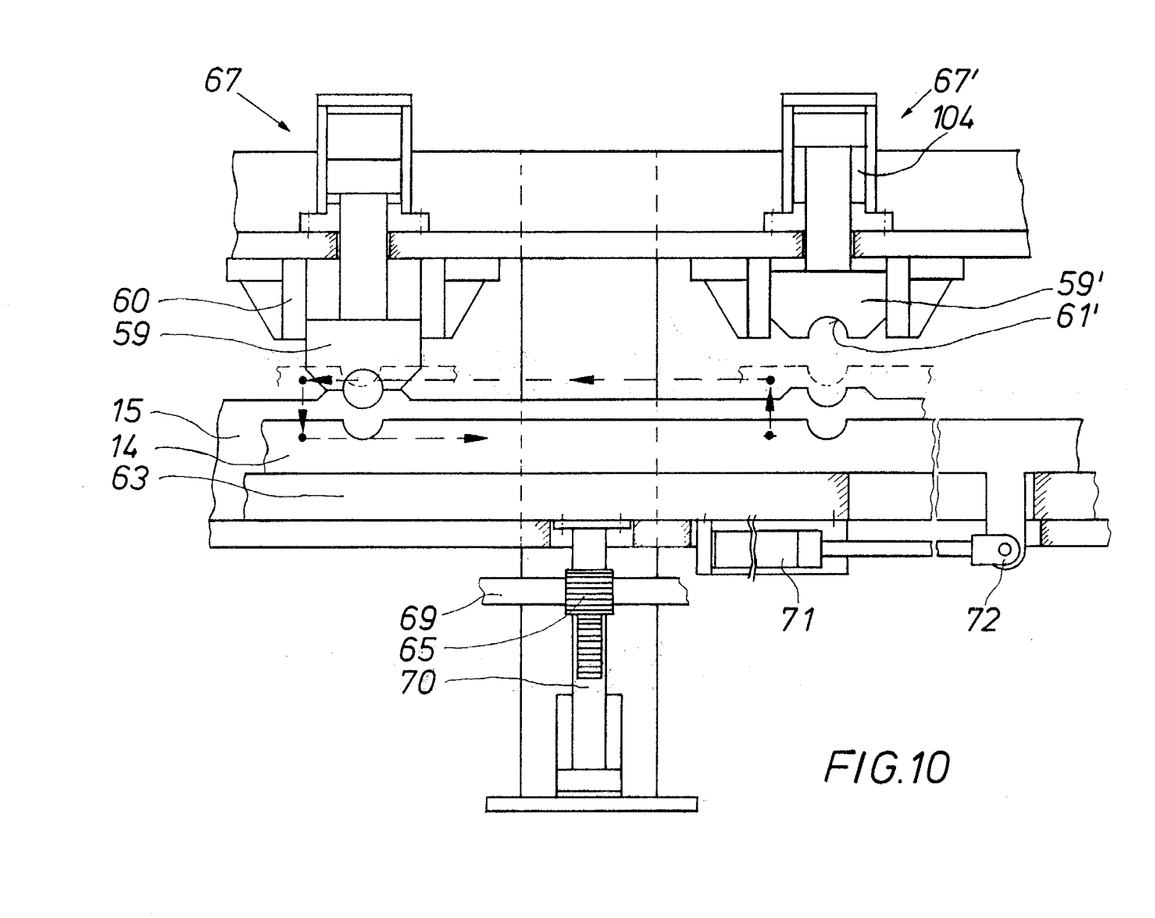
FIG. 10 shows a detail of FIG. 9 at an enlarged scale.

Two workpiece clamping jaws are schematically illustrated in FIG. 7 and in the left portion of FIG. 7 the clamping jaws are shown in closed and at the right part the clamping jaws are shown in the open position. During any operation on the workpiece the latter is located in the cutout 62 of the lower fixedly mounted clamping jaw 15 and is held therein by means of the movable clamping jaw 59 with the cutouts 61. The clamping is produced by feeding of pressure fluid into the upper compartment of the clamping cylinder 67, the piston of which is fixedly connected by means of the piston rod 68 to the movable clamping jaw 59. The movable clamping jaw 59 is guided for moving in vertical direction between the fixed guides 60. The clamping jaws 15 and 59, clamp, as shown in FIG. 7, the workpieces in each of the welding stations during the welding process. Clamping jaws of the same type are also integrated in the region of the stepped beam conveyor 14, as shown in FIGS. 9 and 10, and as also schematically indicated in FIGS. 1 and 2, in which the lower clamping jaw 15 is schematically shown at each of the working stations.

If the various working stations and welding stations operate in a perfect manner, that is when the provided measuring instruments will not indicate values which are outside the predetermined tolerances, then the cylinder space 104 below the piston in the working cylinder is impinged with pressure fluid, as shown for the clamping cylinder 67' at the right side of FIG. 7, so that the piston rod 68' will move upwardly to thereby move the movable clamping jaw 59' with the cutout 61' out of engagement with the workpiece.

Figure 8:
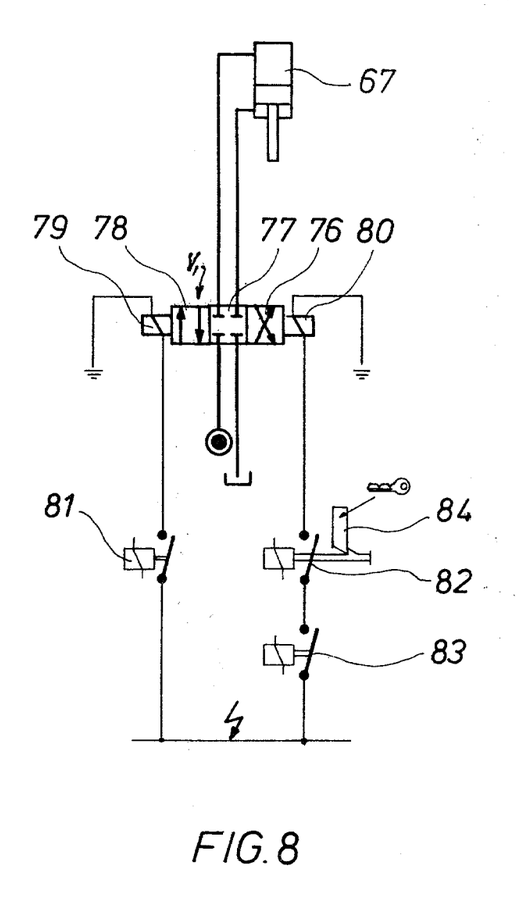
FIG. 8 illustrates the circuit diagram for controlling operation of the clamping jaws.

FIG. 8 illustrates the circuit diagram for a control arrangement, which circuit diagram is a continuation of the diagram shown in FIG. 11. The circuit diagram of FIG. 8 shows a four-port, three-position valve $V_1$ which controls flow of pressure fluid to the clamping cylinders 67 of which only one is shown in FIG. 8.

During operation on a workpiece the latter is clamped between the movable clamping jaw 59 and the fixed clamping jaw 15, as shown at the left side of FIG.

7. If now, any of the control elements shown in FIG. 11 indicates a faulty operation at the respective working or welding station, a control current flows, as explained before, through the control circuit and opens the relay 82 whereby a locking mechanism 84, which may be spring-pressed, snaps in an extension of the relay 82 and holds the switch connected thereto in open position. Even if the relay 83 in series connected with the relay 82 is closed, current cannot flow through the solenoid spool 80 of the valve $V_1$ since such current flow is prevented by the open relay 82. The valve $V_1$ will therefore remain in the middle position as shown in FIG. 8 in which flow of pressure fluid into the upper compartment of the clamping cylinder 67 and outflow of pressure fluid from the lower compartment thereof is prevented. The piston in the cylinder 67 remains therefore in its clamping position as shown at the left side of FIG. 7 and the removal of the workpiece is thus prevented. The measuring instruments shown in FIG. 11 will indicate from which working station or welding station the faulty operation on the workpiece results so that the operator may properly adjust the elements of the respective working or welding station to preclude further production of faulty workpieces. After such an adjustment is made the locking mechanism 84, which is preferably only operatable by a key held by a supervisor, is released and the relay 82 is manually closed. At the closed relay 82 and closing of the relay 83 a current will flow through the solenoid spool 80 of the valve $V_1$ and the latter is moved towards the left into the position 76 so that pressure fluid will move into the compartment of the cylinder 67 below the piston therein and flow out of the upper compartment of the cylinder. The movable clamping jaw is thus moved to the open position 59' as shown at the right side of FIG. 7 so that the faulty workpiece may be removed from the opened clamping jaws.

As mentioned before, clamping jaws as illustrated in FIG. 7 are also provided at the various operating stations in the region of the stepped beam conveyor 14 and the control arrangement as shown in FIG. 8 may also be used for controlling the upward movement of the stepped beam conveyor 14.

FIG. 9 schematically illustrates the stepped beam conveyor 14 in a side view. After finishing the operations at the various working and welding stations, then, provided the various control stations indicate that the operations are performed in a perfect manner, the clamping jaws 59 are open and the relay 82 as shown in FIG. 8 remains closed. The compartment of the cylinder 74 below the piston arranged therein is now impinged with pressure fluid so that the piston and the piston rod 73 connected thereto moves in upward direction. The upper portion of the piston rod 73 is constructed as a rack 70. This rack 70 engages a pinion 65 cooperating therewith. The pinion 65 and two further pinions 65 are fixedly connected to a shaft 69 which is turnably mounted, in any convenient manner not shown in the drawing, in uprights 75. The pinion 65 at the opposite ends of the shaft 69 mesh with outer racks 66, which, as well as the rack 70, are connected at their upper ends to a guide rail 63 on which the beam 14 is mounted for movement in horizontal direction. FIGS. 9 and 10 also show a substantially horizontally arranged cylinder 71 and the piston rod of the piston slidably guided in the cylinder 71 is pivotally connected at 72 to a downwardly projecting lug of the beam 14, so that during actuation of the cylinder 71 the beam 14 which is slidably guided on the guide rails 63 may be shifted horizontally in the one or the other direction.

Figure 13:
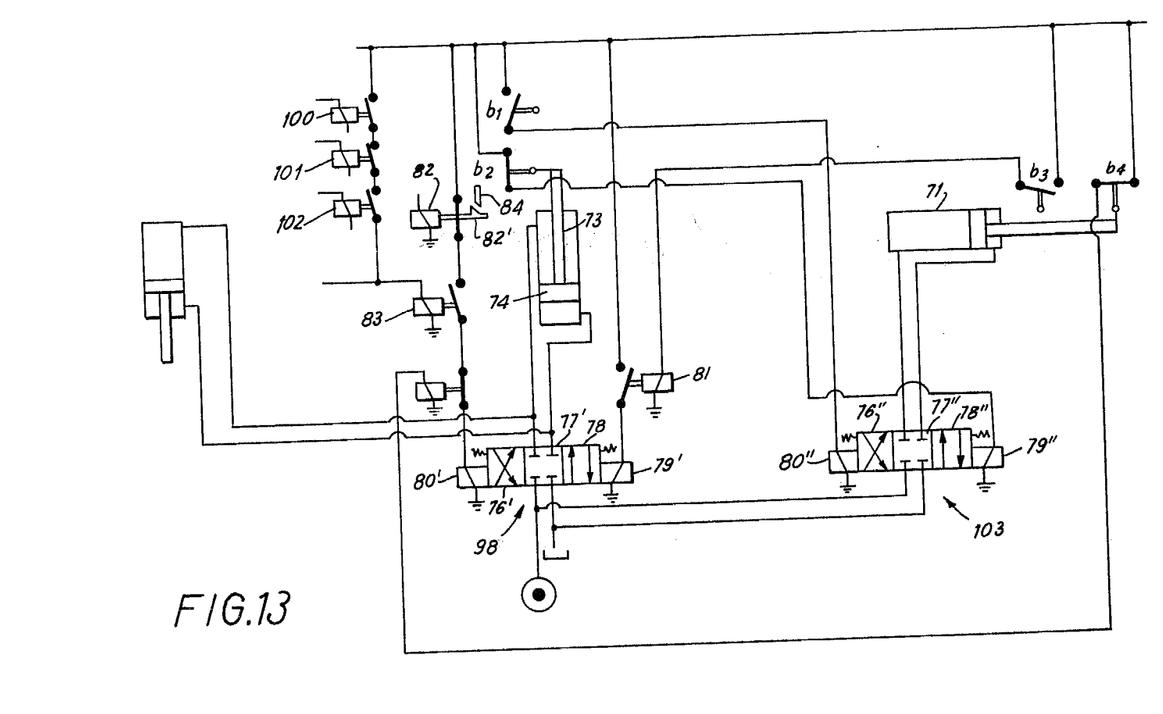
FIG. 13 shows the circuit diagram for operation of the clamping jaws and for actuation of the lifting and shifting cylinders for the stepped beam conveyor for an arrangement in which a stepped beam conveyor is used to transport the workpieces between the various stations.

The automatic operation of the above-described arrangement will now be described in connection with the diagram of FIG. 13 which is a continuation of the diagram shown in FIG. 11.

At the beginning of the operation, the workpieces are clamped in the various operating stations between the stationary clamping member 15 and the movable clamping jaw 59 as shown at the left side of FIG. 10. After the main welding station 49, the auxiliary welding station 45, and the indentation and perforation station 27 have finished the operation on the workpieces respectively clamped at these stations, the relays 100, 101, and 102 respectively coordinated with the aforementioned stations will receive positive impulses and close the relay 83. It is to be understood that if any operation performed by the other working or welding stations shown in FIGS. 1 and 2 should take longer than the aformentioned three operations, an additional relay would have to be provided coordinated with that operating station which takes the longest time, so that the relay 83 will be closed only after all operations to be performed on the workpieces have been finished. Provided that none of the instruments shown in FIG. 11 indicate a faulty operation, and the relay 82 stays closed, closing of the relay 83 will cause energizing of the spool 80' of the four-port three-position valve 98 so that the valve member of this valve is shifted towards the right to the position 76' so that hydraulic pressure medium will flow in the compartment of the lifting cylinder 74 beneath the piston therein so that the latter moves in upward direction to raise thereby the beam 14 to the position shown in dotted lines in FIG. 10 to thereby lift the workpieces out of the indentation of the stationary clamping member 15. At the same time pressure fluid flows also into the compartments of the cylinders 67 below the pistons therein so that the movable clamping jaws are moved to the upper position 59' as shown at the right side of FIG. 10. During the upward movement of the piston rod 73 of the piston in the lifting cylinder 74 the limit switch $b_2$ will be opened and at the end of the upward movement of the piston rod 73 the limit switch $b_1$ will be closed. Closing of the limit switch $b_1$ causes energizing of the spool 80'' of the four-port, three-position valve 103, so that the latter is shifted from its neutral position 77'' towards the right to the positon 76'', so that pressure fluid will flow to the right side of the piston in the shifting cylinder 71 causing this piston and the piston rod connected thereto move towards the left, shifting thereby the beam 14 in the same direction as indicated by the upper arrow in FIG. 10. During this shifting movement the workpieces in the cavities 62 of the beam 14 will be shifted from one to the next operating station and at the same time a blank $2_o$ will be taken from the magazine 12 and the finished product at the end of the operating line will be moved to the magazine 58 for finished products. During this movement of the piston rod of the piston in the shifting cylinder 71 towards the left, the limit switch $b_4$ will be opened and the limit switch $b_3$ will be closed. Closing of the limit switch $b_3$ will energize the relay 81 which closes the switch connected thereto so that the spool 79' of the valve 98 will be energized which moves the valve member towards the left to the position 78' which causes the piston in the lifting cylinder 74 to move in downward direction so that the beam 14 is moved likewise downwardly to the position shown in full lines in FIG. 10. Downward movement of piston rod 73 will open limit switch $b_1$ and close limit switch $b_2$, energizing spool 79" of valve 103 shifting the latter to the position 78" to feed pressure fluid to the left side of the piston in the shifting cylinder 71 so that the beam 14 moves back to the right. At the same time pressure fluid will also flow into the compartments of the clamping cylinders 67 above the pistons therein so that the clamping jaws 59 will move in downward direction to the position shown at the left side of FIG. 10 thereby clamping the workpieces again between the clamping jaws 59 and the stationary clamping member 15, whereafter the aforementioned cycle is repeated.

If during operation on the workpieces any of the instruments shown in FIG. 11 should indicate a faulty operation, the relay 82 becomes deenergized and opens the switch connected thereto so that the spring pressed latch 84 will engage behind the projection 82' to keep the switch connected to the relay 82 in open position which deenergizes the spool 80' so that the valve member of the valve 98 will move under the influence of the springs connected thereto to the middle position 77' locking thereby the piston in the lifting cylinder 74 and the piston in the clamping cylinder 67. The workpieces will stay clamped and further operation of the assembly line is interrupted. Only after appropriate adjustment in the respective working or welding station which caused the faulty operation on the workpiece is the latching mechanism 84 released and this latching mechanism is, as mentioned before, preferably constructed to be releasable only with a key and the open relay is subsequently manually closed. When the relay 82 is closed current will again flow to the spool 80' of the valve 98 after closing of the relay 83 and the aforementioned operating cycle will be repeated.

It is to be understood that the shifting cylinder 28 and the return cylinder 29 of the station 27, the cylinder cooperating with the shifting jaw 43, the shifting cylinder 47 and the clamping jaw 48 connected thereto, the clamping jaw 37 on the cross slide 38 and the latter, as well as the shifting cylinder 54 shifting the bracket 7 from the storage bin 53 onto the portion 2c of the protecting tube are also operated in step with the above-described operations, but for simplification reason the wiring diagram for operation of the aforementioned members is not shown in the drawing. It is also to be understood, that whenever a workpiece is properly clamped at the respective station, the tools, respectively the welding electrodes, are automatically advanced in a known manner to perform their work and thereafter automatically retracted to the positions shown in FIGS. 1 and 2.

While in the above described installation only four control stations 36, 50 51 and 57 are provided, it is evident that additional control stations could be employed for checking the operations in additional working stations. For instance, a control station could be coordinated with the corrugation station 39 for checking the length and diameter of successive corrugations. It would also be possible to provide in the control station coordinated with the auxiliary welding station 45 appropriate instruments for checking the proper position of the guide bracket 9 connected to the end region of the corrugated tube. Evidently, further control stations may be coordinated with the working stations 16, 20 and 21 for checking the diameters of the end portions of the blank $2_o$ which are produced in these working stations.

It will also be evident that the outer column as shown in FIGS. 5 and 6 could be produced in a similar installation as described above with a corresponding modification.

It will be understood that each of the elements described above, or two or more together, may also find a useful application in other types of methods for series-production of auto column for safety steering column of automotive vehicles differing from the types described above.

While the invention has been illustrated and described as embodied in a method for series production of auto columns for safety steering columns of automotive vehicles in which the elements from which the outer column is produced are stepwise passed through various operating stations and checked as to quality in several control stations coordinated with at least some of the operating stations and wherein upon ascertaining of a faulty product in one of the control stations further operation is automatically stopped it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for series-production of an outer column for a safety steering column for motor vehicles from two tubular blanks and pressed metal sheet parts to attach the outer column to parts of a motor vehicle, comprising the steps of stepwise transporting a first tubular blank to a plurality of working stations for deforming or punching said first tubular blank to form a substantially smooth walled protecting tube of the outer column therefrom; simultaneously feeding a second tubular blank to a corrugation station in which the second tubular blank is transformed into a corrugated tube; feeding the protecting tube and the corrugated tube against each other so that end portions of said tubes overlap; welding said overlapping end portions of said tubes to each other in a main welding station; welding at least one pressed metal sheet part in an auxiliary welding station to one of said tubes; checking the work performed by at least one working station by at least one automatic control station coordinated therewith; checking the weld produced by at least one welding station by a further automatic control station coordinated with said one welding station; stopping upon asserting of a faulty part in one of said control stations operation of all working and welding stations upstream of said one control station under simultaneous blocking the parts in said upstream working and welding stations; and permitting resuming operation of said working and welding stations only after removing of the faulty part.

2. A method as defined in claim 1, wherein upon asserting of a faulty part by one of said control stations operation of all working and welding stations is stopped under simultaneous blocking the parts in all of said working and welding stations, and permitting resuming operation of said working and welding stations only after removing of the faulty part.

3. A method as defined in claim 2 wherein said tubular blanks and said welded together tubes are stepwise transported by transporting means including a stepping beam conveyor and shifting cylinders, and wherein said transporting means are automatically stopped upon ascertaining a faulty part by one of said control stations.

4. A method as defined in claim 2, wherein the control station coordinated with one welding station checks the welding parameters of the weld produced by said one welding station.

5. A method as defined in claim 4, wherein a control station coordinated with said main welding station checks the welding current, the welding voltage, the welding time and the pressure at which the welding electrodes are pressed against the workpiece by comparing desired values of these welding parameters with actual values thereof and blocking said parts at said working and welding stations if the established actual values surpass a predetermined tolerance value of said desired values.

6. A method as defined in claim 2, wherein said plurality of working stations include a station for punching holes in said first tubular blank and wherein a control station following said said hole punching station is provided for checking the position and geometry of the punched holes.

7. A method as defined in claim 2, wherein the blocking of the parts in said working and welding stations is performed by clamping jaws movable between a clamping and a releasing position, and wherein all said clamping jaws are held in said clamping position upon ascertaining a faulty workpiece by one of said control stations.

8. A method as defined in claim 7, wherein said clamping jaws, after being held in said clamping position upon ascertaining a faulty workpiece, may be moved from said clamping to said releasing position only by a key-operated control arrangement.

* * * * *